Patented Sept. 24, 1946

2,408,146

UNITED STATES PATENT OFFICE 2,408,146

DEHYDROGENATION OF HYDROCARBONS

Kenneth K. Kearby, Elizabeth, N. J., assignor, by mesne assignments, to Jasco, Incorporated, a corporation of Louisiana No Drawing. Application September 19, 1941, Serial No. 411,559

10 Claims. (Cl. 260—680)

This invention relates to the catalytic dehydrogenation of hydrocarbons of low molecular weight, i. e. those having 2 to 5 carbon atoms, and is more particularly concerned with improved methods of operation and improved catalysts for use therein.

Typical of processes for the catalytic dehydrogenation of low molecular weight hydrocarbons are processes for converting butane to butene and processes for converting butene to butadiene. Both butene and butadiene are of increasing importance as raw materials for the preparation of other products. For example, butene is an essential raw material in alkylation processes for the production of isooctane or other high octane number hydrocarbons slutable for use as motor fuels; isobutene is an essential raw material for the preparation of isobutene polymers of various molecular weights; and butadiene is an essential raw material for the production of synthetic rubbers such as Buna-N, Buna-S, and butyl rubber.

In the production of olefins and diolefins by the catalytic dehydrogenation of paraffins and olefins respectively it is of course desirable to obtain as high a yield of the olefin or diolefin as possible on one passage of the initial material through the dehydrogenation zone and to obtain as small an amount as possible of by-products. It is also desirable to conduct the dehydrogenation under such conditions and in the presence of such catalysts that the formation of coke on the catalyst will be as low as possible. The efficiency of the catalyst is best measured in terms of percent selectivity which means the percent of the total amount of initial material which undergoes conversion which is converted to the desired dehydrogenated product. For example, if 50% of the initial material undergoes conversion in the reaction zone and 30% of this 50% consists of the desired dehydrogenated product, then the percent selectivity would be 60.

I have discovered a new type of catalyst which when used under certain conditions in the catalytic dehydrogenation of low molecular weight hydrocarbons makes it possible to obtain substantially greater yields of the desired dehydrogenated product than can be obtained by the use of previously known catalysts. The nature of the new catalysts and the conditions under which they are used will be fully understood from the following description:

For purposes of description it will be assumed that it is desired to prepare butadiene by the catalytic dehydrogenation of butene. The catalyst to be used comprises 52–89.4% by weight of magnesium oxide; 10 to 40% by weight of chromium oxide ($Cr_2O_3$); and 0.5 to 3.0% by weight of potassium oxide. The presence of small amounts, say from 0.3 to 5.0% by weight, of the oxides of cerium, sodium, barium, aluminum, lead, titanium or copper is found to be beneficial in many cases. A particularly effective catalyst has the following composition:

| Component | Per cent by weight |
|---|---|
| MgO | 78 |
| $Cr_2O_3$ | 20 |
| $K_2O$ | 1.5 |
| $CeO_2$ | 0.5 |
| | 100 |

One method of preparing a catalyst having the composition just given is as follows:

306 grams of magnesia are stirred into 2 liters of distilled water. To this mixture 1 liter of a water solution of 405 grams of chromium nitrate and 5.1 grams of cerium nitrate is slowly added. 600 cc. of concentrated ammonium hydroxide are then added and the mixture is stirred for about ten minutes. The precipitate is filtered and washed. The washed precipitate is then stirred into 50 cc. of a solution containing 12.35 grams of potassium nitrate and thoroughly mixed. The paste so formed is dried in a steam oven and then heated for about 3 hours at about 1000° F. The paste before drying and heating may be molded or extruded into pills, pellets, tablets or pieces of any desired shape and size, or the dried and heated mass may be reduced to a fine powder. The form in which the catalyst is prepared will of course depend upon whether it is to be used in fixed or stationary form or in finely divided form suspended in the vapors of hydrocarbon to be dehydrogenated.

Assuming the catalyst is to be used in stationary form, a suitable reaction chamber is filled with pills or pellets of the catalyst. Butene and steam are then passed through the reaction chamber at a rate between 100 and 5000, preferably between 300 and 2000, volumes (measured at normal temperature and pressure) of butene per volume of catalyst per hour. The ratio of steam to butene is between 15:1 and 1:1, preferably from 8:1 to 4:1. The reaction chamber is maintained at a temperature between 1000 and 1600° F., preferably between 1100 and 1300° F., and under atmospheric or slightly above atmospheric pressure. The butene which passes through the reaction chamber unaffected may of course be recycled thereto together with additional steam.

The function of the steam is to dilute the butene and thus reduce the partial pressure thereof in the reaction chamber. At the same time the steam performs another useful function in that it reacts with coke which may be formed or deposited on the catalyst to form carbon oxides and hydrogen. The elimination of at least a portion of the coke in this manner tends to prolong the time the catalyst can be used before it requires regeneration. Thus the reaction portion of a complete cycle of reaction and regeneration may be as long as 25 or 50 hours or more although it is usually preferable in operation to run for periods of ½ hour to 7 hours and then regenerate.

When the catalyst requires regeneration this may be effected by shutting off the flow of butene and passing steam, air, or a mixture of steam and air through the catalyst mass while it is maintained at a temperature between 1000 and 1200° F. Following substantially complete removal of the coke, the flow of butene and steam may be resumed.

The following example illustrates the application of the process to the production of butadiene from butene:

A mixture of butene and steam in the ratio of 7 mols of steam to 1 mol of butene is passed through a reaction chamber containing a catalyst of the composition given in the table above. The reaction chamber is maintained at a temperature of about 1200° F. and under substantially atmospheric pressure, and the mixture is passed through it at a rate of about 618 volumes of butene per volume of catalyst per hour for a period of about 3 hours. The following results are obtained:

| | |
|---|---|
| Total butene converted_____mol per cent__ | 43.4 |
| Butadiene _____do____ | 25.9 |
| Coke _____do____ | 0.5 |
| CO+CO$_2$ _____do____ | 5.03 |
| Per cent selectivity_____ | 59.7 |

It will be seen from the above example that 43.4 mol per cent of the butene is converted and that of this amount 59.7% is converted to butadiene.

This invention is not limited by any theories of the mechanism of the reactions nor by any details which have been given merely for purposes of illustration.

I claim:

1. An improved process for the catalytic dehydrogenation of low molecular weight olefins, which comprises adding steam to the olefins in the ratio of 15:1 to 1:1 of steam to olefins, and passing the mixture at a temperature between 1000 and 1600° F. over a catalyst comprising a major proportion of magnesium oxide and a minor proportion of chromium oxide and an alkaline oxide having the power to promote the reaction of the steam with carbon deposited on the catalyst during the reaction.

2. Process according to claim 1, in which the catalyst contains about 52–89.4% by weight of magnesium oxide, 10–40% by weight of chromium oxide, and about 0.5–3.0% of potassium oxide.

3. Process according to claim 1, in which the catalyst contains about 52–89.4% by weight of magnesium oxide, 10–40% by weight of chromium oxide, about 0.5–3.0% of potassium oxide, and about 0.5% cerium oxide.

4. An improved process for the catalytic dehydrogenation of olefins which comprises diluting the hydrocarbons with steam and passing the mixture at a temperature between 1000 and 1600° F. over a catalyst comprising a major proportion of magnesium oxide and minor proportions of chromium oxide and potassium oxide.

5. An improved process for the catalytic dehydrogenation of olefins having between 2 and 5 carbon atoms which comprises diluting the hydrocarbons with a large volume of steam and passing the mixture at a temperature between 1000 and 1600° F. over a catalyst consisting of a major proportion of magnesium oxide, a minor proportion of chromium oxide and small amounts of potassium oxide and cerium oxide.

6. An improved process for the catalytic dehydrogenation of an olefin having four carbon atoms which comprises diluting said hydrocarbon with from 1 to 15 mols of steam and passing the mixture at a temperature between 1000 and 1600° F. over a catalyst consisting of a major proportion of magnesium oxide, a minor proportion of chromium oxide and small amounts of potassium oxide and cerium oxide.

7. An improved process for the catalytic dehydrogenation of butene which comprises diluting the butene with from 4 to 8 volumes of steam and passing the mixture at a temperature between 1000 and 1600° F. over a catalyst consisting of between 52 and 89.4% by weight of magnesium oxide, 10 to 40% by weight of chromium oxide, 0.5 to 3.0% by weight of potassium oxide and 0.5 to 5.0% by weight of cerium oxide.

8. Process for converting butene to butadiene which comprises diluting the butene with from 4 to 8 volumes of steam and passing the mixture at a temperature between 1100 and 1300° F. over a catalyst consisting of about 78% magnesium oxide, 20% chromium oxide, 1.5% potassium oxide and 0.5% cerium oxide.

9. An improved process for the catalytic dehydrogenation of low molecular weight olefins which comprises diluting the olefins with steam and passing the mixture at a temperature between 1000° F. and 1600° F. over a catalyst comprising a major proportion of magnesium oxide and minor proportions of chromium oxide and alkaline oxides.

10. Process according to claim 1, in which butene is converted to butadiene.

KENNETH K. KEARBY.